May 16, 1950 J. J. UMPHREY 2,507,553
MECHANICAL RADIALLY EXPANDING CLUTCH STRUCTURE
Filed June 29, 1945 2 Sheets-Sheet 1
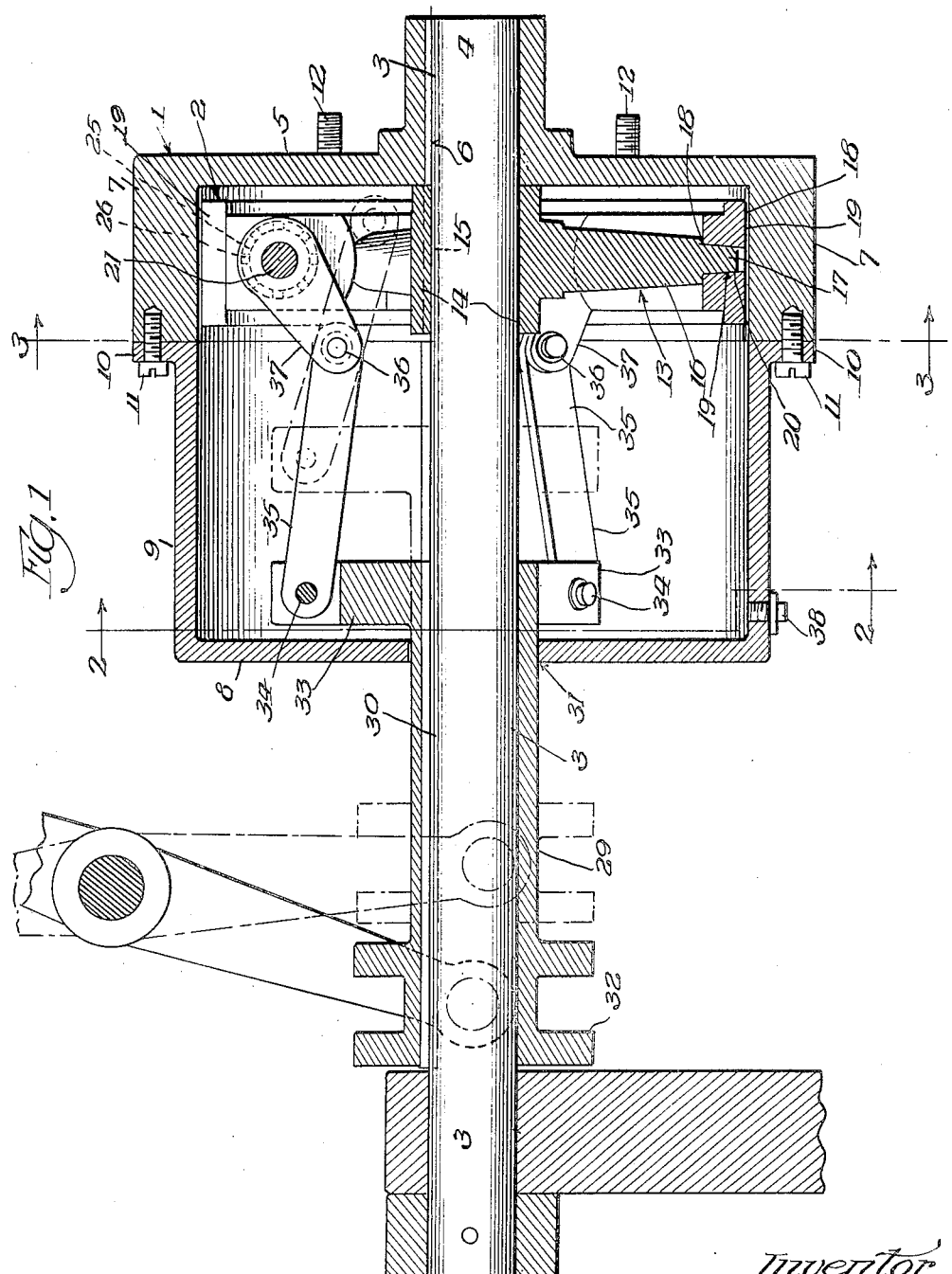
Inventor
Jacob J. Umphrey
By Spencer, Marzall, Johnston & Cook,
Attys.

May 16, 1950  J. J. UMPHREY  2,507,553
MECHANICAL RADIALLY EXPANDING CLUTCH STRUCTURE
Filed June 29, 1945  2 Sheets-Sheet 2
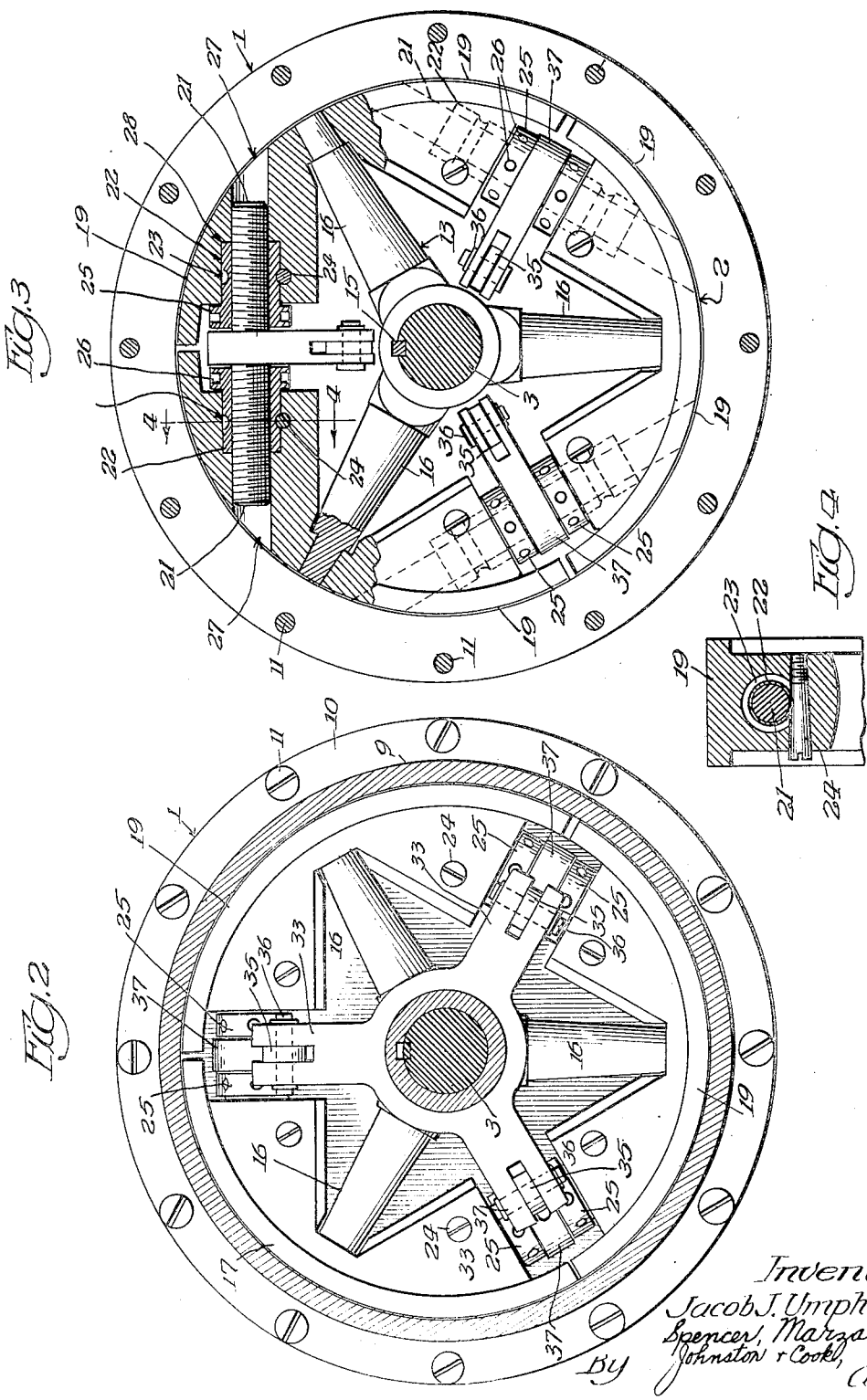
Inventor
Jacob J. Umphrey
By Spencer, Marzall, Johnston & Cook
Attys Patented May 16, 1950

2,507,553

UNITED STATES PATENT OFFICE 2,507,553

MECHANICAL RADIALLY EXPANDING CLUTCH STRUCTURE

Jacob J. Umphrey, Coloma, Mich., assignor to Joe F. Reed, Watervliet, Mich.

Application June 29, 1945, Serial No. 602,191

1 Claim. (Cl. 192—76)

This invention relates to mechanical clutch structures in general and particularly to mechanical structures of the expanding type for use with certain mechanisms.

This application is a continuation in part of applicant's copending application Serial No. 447,402, filed June 17, 1942, and now abandoned.

The primary object of the present invention is the provision of a simply constructed metal to metal mechanical structure embodying complemental units, either of which may be used as the active or driving member or the inactive or driven member whereby the device is adapted to slip and gradually pick up a load so as to obviate grabbing or jerking when the device is used as a clutch.

Another object of the invention is the provision of a device embodying new and improved means for effecting an expansion of a device during rotation thereof for engagement with a stationary cylindrical element whereby metal to metal contact may be made with a slip action to gradually effect a braking action on the cylindrical member when the device is used as a brake mechanism.

Still another object of the invention resides in the provision of a mechanical structure, such as a clutch or brake, whereby a plurality of radially extending circumferentially mounted shoes are arranged for radial expansion during the coming to speed of the structure whereby expansible shoe elements are adapted to be brought into contacting engagement with a rim or band with which the shoes cooperate to effect first a gentle gripping action and a slipping when required.

Numerous other objects and advantages will be apparent throughout the progress of the following specification.

The accompanying drawings illustrate certain selected embodiments of the invention and the views therein are as follows:

Fig. 1 is a detail longitudinal sectional view of one form of the mechanical structure and embodying the invention;

Fig. 2 is a detail sectional view on the line 2—2 of Fig. 1;

Fig. 3 is a detail sectional view on the line 3—3 of Fig. 1; and

Fig. 4 is a detail sectional view on the line 4—4 of Fig. 3.

The particular construction herein shown for the purpose of illustrating the invention comprises an outer unit 1 and an inner unit 2 which are adapted to be mounted on a longitudinally extending shaft 3. The shaft 3 is provided with an end 4 for operatively connecting the shaft to a driven member, such as the driving shaft of an engine. The unit 1 may be used as a driving member for driving the unit 2, or the unit 2 may be the driving member and the unit 1 may be the driven member.

The unit 1 comprises an end wall or end section 5 which is centrally apertured as indicated at 6, Fig. 1, for mounting rotatively the unit on the shaft 3. An annular flange 7 is preferably made integral with the side section 5 and forms a band, ring or drum which is concentric to the shaft 3. A housing 8 is adapted to close the open end of the unit 1.

The housing 8 comprises a dish-shaped cap section terminating into an annular flange section 9 for abutting relationship with the flange 7 whereby there is provided an entirely closed casing or compartment for housing the operating parts. This casing or compartment may contain oil. The housing 8 is provided with an annular flange 10 extending from the part 9 thereof, the annular flange being in abutting relationship with the edge of the flange 7, as clearly shown in Fig. 1. Flange 10 may be locked to the flange 7 in any convenient manner, such as by set screws 11. Threaded studs 12 may be fixed to the end section 5 of the unit 1 so that the unit 1 may be connected to a driving unit when the unit 1 is the driving member and the unit 2 is the driven member.

The unit 2 comprises a spider 13 having a central hub 14 which may be secured to the shaft 3 by means of a key 15. The spider 13 includes a plurality of radially extending arms 16. These arms are spaced an equal distance apart and each arm terminates into a reduced stud 17 providing shoulders 18 adjacent the outer ends of the three arms 16.

A plurality of elongated shoe elements 19 have outer clutching surfaces concentric to the flange 7 and are arranged end to end in concentric relationship to the spider and to the shaft 3. The outer clutching faces of each arcuate shoe element is flat transversely to conform to the inner flat transverse surface of the ring, rim or drum flange 7. Each shoe element is provided with a socket 20, by means of which it may be slidably mounted on one of the outwardly tapered studs 17 for movement radially of the flange 7 and into and out of clutching engagement therewith.

The shoe elements 19 are assembled with their ends in confronting relationship, as clearly shown in Figs. 2 and 3. The confronting ends of adjacent shoe elements 19 are connected together by means of threaded adjusting rods 21 having right and left hand threads. These adjusting rods 21 are threadedly received in cooperating sleeves 22 which are secured in aligned openings formed in adjacent shoes, Fig. 3. The sleeves 22 are provided with an annular groove 23 and are locked in adjusted position by means of set screws 24, Figs. 3 and 4. The ends of the sleeves 22 terminate into annular extensions or heads 25 having spaced recesses 26 provided therein so that a tool may be applied to the heads 25 for effecting adjustment of one shoe element relative to its adjacent shoe element.

The set screw 24 locks each sleeve 22 in position and permits for adjustment of one shoe relative to the other so that adjacent ends of shoe elements 19 may be brought closer together or farther apart for adjusting purposes. Each sleeve 22 is prevented from axial movement with respect to its cooperating threaded rod 21 and is wedgingly locked so as normally to prevent rotation thereof.

Adjustment between adjacent shoe elements 19 is effected by first releasing or loosening the set screws 24 whereupon the sleeves 22 may be given rotative movement. This rotative movement on the right and left of the screw rods 21 provides for adjustment to bring the shoe elements closer together or farther apart, as desired. The recesses 26 and the heads 25 of the sleeves 22 are arranged in proper alignment so that adjacent heads 25 may be grasped by the same tool to effect rotative movement of the sleeves 22 when the locking set screws 24 have been released.

After the adjustment has been effected, the set screws 24 are screwed into place to prevent longitudinal and rotative movement of the sleeves in the longitudinal bores 27 provided in the shoes, Figs. 3 and 4. The longitudinal bores 27 are stepped or counterbored as at 28, Fig. 3, so as to receive the sleeves 22. The adjusting rods 21 are arranged crosswise of the axis of rotation of the shoe elements 19 in the plane of the spider 13, and each rod 21 is threaded into a pair or set of sleeves 22 of the shoe ends which it connects by means of right and left hand threads, respectively. The arrangement is such that rotation of the rod in one direction tends to separate the shoes or split them apart and thereby expand the same toward the flange 7. Rotation of the rods in the opposite direction will tend to draw or retract the shoe elements together and space them from the flange 7. The movement of the shoes radially, either inwardly or outwardly, is permitted by the sliding engagement of the shoe elements on the studs 17.

A clutch shifter sleeve 29 extends into the housing 8 and is slidably mounted on the shaft 3. A cooperating key and keyway 30 are provided for locking the clutch shifter sleeve 29 to the shaft 3. The sleeve 29 is provided with an outer grooved part 32 for connection with a suitable clutch shifter whereby the sleeve is moved axially along the shaft when the shifter is operated.

Radially extending arms 33 are provided on the inner end of the sleeve 29 and have pivotally connected thereto at 34 the outer ends of links 35. The inner ends of the links 35 are pivotally secured at 36 to crank arms 37 which are rigidly secured to the threaded rods 21, Fig. 1. The housing 8 closely encircles the sleeve 29 outwardly of the arms 33 and links 35. It is to be noted that the link connections at 34 are farther away from the shaft 3 than the pivot joints at 36 throughout the range of operating movement.

A drain plug 38, Fig. 1, may be provided in the housing 8 for filling and draining purposes if the compartment or casing is to contain oil.

Operation

Sliding movement of the clutch sleeve 29 on the shaft 3 will cause rocking movement of the threaded rods 21 depending upon the movement of the sleeve 29. In normal operation the clutch shifting rod is moved from its normal inoperative position, shown in full lines in Fig. 1, to normal operating position as shown in dotted lines in the same figure. When the sleeve 29 is moved from its normal inoperative left hand position, Fig. 1, toward the right, to dotted line position, the links 35 will swing the crank arms 37 and thereby rotate the rods 21.

Rotation of the rods in a counterclockwise position, as shown in dotted lines in Fig. 1, will cause the shoe elements 19 to come into engagement with the internal surface of the flange 7, and thereby frictionally connect the unit 1 to the unit 2. Shifting of the sleeve 29 from the dotted line position to the full line position, shown in Fig. 1, will cause the rods 21 to be moved in a clockwise direction whereupon the shoe elements 19 are withdrawn from engagement with the flange 7 and thereby prevent driving relation between the units 1 and 2.

Regardless of which unit is used as the driver, the clutching action is effected between the flange 7 and the shoe elements 19. The construction is such that there will be a slipping action between the two elements so as to overcome grabbing or jerking when the elements 1 and 2 are brought into driving relationship.

The parts above described refer principally to the structures disclosed in Figs. 1 to 4, inclusive, and have been described as elements for clutching purposes. However, the device is capable of being used as a brake. When the device is used as a brake, the element 1 would constitute the brake drum on an automobile wheel, while the element 2 would be mounted on the shaft adjacent the drum whereby the shoes would be brought into braking relationship with the brake drum when the sleeve 29 is operated. The sleeve 29 would be operatively connected to the brake pedal.

The invention provides a device having few and simple parts which are strong and durable in construction and which may be readily and economically manufactured. The structure disclosed in Figs. 1 to 4, inclusive, is adapted for use not only as a clutch, but may also be used as a brake mechanism. The structure disclosed in Figs. 1 to 4, inclusive, may be used reversely, that is, the unit 1 may be the driving element and the unit 2 may be the driven element, or, conversely, the unit 1 may be the driven element and the unit 2 may be the driving element.

Changes may be made in the form, construction and arrangement of the parts without departing from the spirit of the invention or sacrificing any of the advantages thereof, and the right is hereby reserved to make all such changes as fairly fall within the scope of the following claim.

The invention is hereby claimed as follows:

In a clutch, a shaft; a member rotatable on said shaft and including a side web and a lateral annular flange on said web surrounding said shaft; a spider splined fast on said shaft within said flange and having equally spaced radial arms; an arcuate clutch shoe slidably mounted on the outer end of each of said arms for movement in end-to-end relation with adjacent shoes radially of said first-mentioned flange into and from clutching engagement therewith, the adjacent ends of said shoes each having a bore therein in alignment with the other, a sleeve in one bore and having a right hand threaded bore, a sleeve in the other bore and having a left hand threaded bore, and a screw member having right and left hand threads engageable respectively with the right and left hand threaded bores in each pair of adjacent sleeves; individual means for adjustably holding said sleeves in their respective bores; a clutch shifter sleeve splined on said shaft at one side of said spider for sliding movement thereon toward and from the spider, said shifter sleeve being provided with a plurality of equally spaced radially extending arms on the end adjacent the spider and corresponding in number to the arms of the spider; a pivotally joined link and crank connected with each arm of the shifter sleeve and with each screw member respectively for moving said clutch shoes toward and from said annular flange, said link and crank connections being disposed in respective planes extending between adjacent radial arms and broken toward the axis of the shaft throughout the range of operating movement, and the connections of the links to the arms of the shifter sleeve being farther away from said shaft than the pivot joints with the cranks throughout the range of operating movement; and a housing having an annular flange portion arranged as a continuation of the annular flange of the rotatable member, a radial flange detachably secured to the end of said last-mentioned annular flange, and an inwardly extending end flange closely encircling the shifter sleeve outwardly of the arms thereof to completely enclose the spider, shoes and linkages.

JACOB J. UMPHREY.

REFERENCES CITED

The following references are of record in the file of this patent:

UNITED STATES PATENTS

| Number | Name | Date |
|---|---|---|
| 228,276 | Ray | June 1, 1880 |
| 266,761 | Brown | Oct. 31, 1882 |
| 392,423 | Gifford | Nov. 6, 1888 |
| 727,003 | Shouvlin | May 5, 1903 |
| 1,081,861 | Pagani | Dec. 16, 1913 |
| 1,088,805 | Brown | Mar. 3, 1914 |

FOREIGN PATENTS

| Number | Country | Date |
|---|---|---|
| 2,890 | Great Britain | 1882 |
| 8,686 | Great Britain | of 1898 |
| 340,061 | France | of 1904 |